2,897,085
PROCESS OF CONCENTRATING PIMIENTO PEPPERS

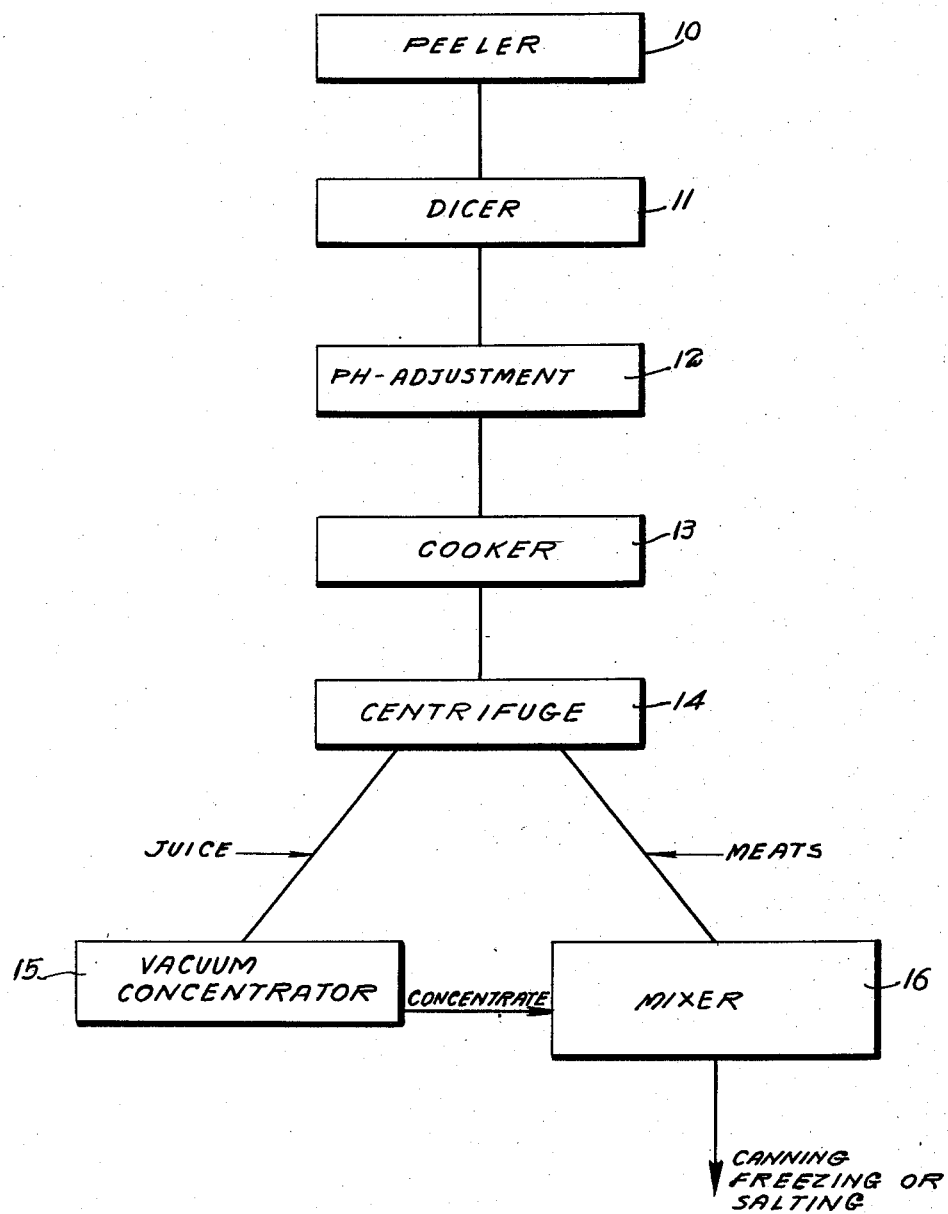

Eric E. Todd, Malibu, Calif.

Application August 15, 1955, Serial No. 528,410

1 Claim. (Cl. 99—103)

This invention relates to a method of concentrating peppers and particularly pimiento peppers. It is a prime object of this invention to provide a method of concentrating such peppers without injury to the product and without the disadvantages attending current commercial practices. It has been found that current commercial practices for concentrating and preparing what is commercially known as "dehydro-frozen pimientos" have failed to give a satisfactory product.

When using tray drying, commercial practice has the following disadvantages: Wooden trays always give splinters in the dehydrated product. Overdrying of the pimiento pieces gives a scorched flavor and stringy texture, giving the off flavors that occur in concentrations over 23% and bleeding of the pimientos during drying is responsible for serious losses in recovery. Trays of other construction are expensive, give serious adhesion problems and the usual uneven dehydration with consequent off flavor. Tray drying is also slow, inefficient and expensive, and gives a product inferior to single strength peppers.

Belt dryers have been suggested but are also expensive to install and have the same inherent difficulties of adhesion, serious juice losses and uneven dehydration.

Solid wall rotary dryers have been proposed which are also expensive and due to constant movement of the product cause severe juice liberation with attendant difficulties and as the solid content of the pimientos passes 12%, adhesion of the product begins on the walls of the dryer, not sufficiently removed by scrapers which have a tendency to crush the peppers. Failure to remove the adhering peppers results in scorching.

Screen wall dryers have been proposed in which an air blast is utilized to prevent adhesion, but the juice losses involved render commercial use impossible.

In all of the commercial practices, dicing has to be performed after drying in order to prevent excessive juice losses. Dicing after drying is highly unsatisfactory due to the sticky, stringy nature of the product. Dices are uneven and ragged, and the count is only one-third that of an equivalent quantity of single strength product.

It is a primary object of the present invention to provide a method of concentrating peppers and particularly pimiento peppers which avoids the difficulties above outlined.

It is a further object of the present invention to provide a fast, simple, inexpensive, labor-saving process with high recovery.

It is a further object of the present invention to provide a process for concentrating such peppers which gives a product which, when reconstituted, is equivalent in color and flavor to single strength product; and in which the number of dices corresponds to the degree of concentration; which avoids off-colored, scorched edges in the meats; which avoids strings of overconcentrated meats and which is free from wood chips.

These and other objects, features and advantages will be apparent from the annexed specification in which the single figure of drawings illustrates diagrammatically the various steps in the process. In carrying out the process with the present invention, the peppers and preferably pimiento peppers are first peeled in a peeling stage 10 and then passed to a dicer 11 in which they are diced to a uniform size. In the next step 12 of the process, dilute citric acid solution is added to adjust the pH to approximately 4.5. The dices thus treated are then charged to a continuous cooker 13, preferably of the thermo screw type, where they are cooked for approximately fifteen minutes at temperatures ranging from 185° to 212° F. The time of heating will vary over a considerable range, depending upon the ripeness of the peppers. The heating of the diced peppers causes a profuse bleeding of the juice upon later agitation and the hot cooked dices are fed directly from the cooker to a centrifuge 14 in which approximately 70% of the total weight is removed as juice. The amount of juice removed can be adjusted by adjusting the time of centrifuging. Juice from the centrifuge 14 is then passed to a vacuum concentrater 15 and concentrated to about 50 Brix. Dices from the centrifuger are passed to a mixer 16 and the concentrated juices from the vacuum concentrater 15 are commingled with the diced product in the mixer to reconstitute the pimientos by absorbing the concentrated juices. The dices may then be canned, frozen or salted for preservation, and can be used either as concentrated in manufactured meats, cheeses and the like, or can be reconstituted with water to give the same number of flavorful, brightly-colored clear-cut dices as would be in an equivalent amount of single strength product.

This application constitutes an improvement of the process for dehydrating and freezing pimientos and peppers found in my co-pending application, Serial No. 408,855, filed February 8, 1954, in the United States Patent Office, now United States Patent No. 2,723,199, issued November 8, 1955.

While there has been described what is at present considered the preferred embodiment of the invention, it will be understood that various changes and alterations may be made therein without departing from the essence of the invention and it is intended to cover herein all such changes and alterations as come within the true scope and spirit of the annexed claim.

I claim:

The process of concentrating peppers comprising the steps of peeling and dicing the pepper meats, heating the meats to bleed juices therefrom, reducing the weight of the mixture of said meats and juices by approximately 70% by separating the juices from the meats; separately concentrating said removed juices, mixing the meats in the absence of dehydration thereof and the concentrated juices to form a concentrated product with said juices absorbed in said meats.

References Cited in the file of this patent

UNITED STATES PATENTS

| | | |
|---|---|---|
| 2,559,459 | Peebles et al. | July 3, 1951 |
| 2,649,378 | Traisman | Aug. 18, 1953 |
| 2,676,889 | Keenan | Apr. 27, 1954 |
| 2,723,199 | Todd | Nov. 8, 1955 |